US010223731B1

(12) United States Patent
Johnson

(10) Patent No.: US 10,223,731 B1
(45) Date of Patent: Mar. 5, 2019

(54) GENERATING ADD-ON ITEM DEALS IN AN ELECTRONIC MARKETPLACE

(71) Applicant: Amazon Technologies, Inc., Seattle, WA (US)

(72) Inventor: Theodore Clifton Johnson, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 15/071,043

(22) Filed: Mar. 15, 2016

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0633* (2013.01); *G06Q 30/0253* (2013.01)

(58) Field of Classification Search
None
See application file for complete search history.

(56) References Cited

U.S. PATENT DOCUMENTS

| | | | | |
|---|---|---|---|---|
| 6,535,229 B1 * | 3/2003 | Kraft | ............... | G06F 3/0481 715/764 |
| 7,295,990 B1 * | 11/2007 | Braumoeller | ........ | G06Q 10/063 705/28 |
| 7,996,265 B2 * | 8/2011 | Evangelist | ....... | G06Q 10/06313 705/22 |
| 8,019,643 B2 * | 9/2011 | Lore | ................ | G06Q 10/06375 705/1.1 |
| 8,055,508 B1 * | 11/2011 | Leblang | ................ | B65G 1/1373 705/1.1 |
| 2002/0133387 A1 * | 9/2002 | Wilson | ............... | G06Q 10/0631 705/338 |
| 2004/0225563 A1 * | 11/2004 | Lawe | ..................... | G06Q 20/06 705/14.23 |
| 2009/0281893 A1 * | 11/2009 | Muhonen | ............... | G06Q 30/02 705/14.42 |

(Continued)

FOREIGN PATENT DOCUMENTS

CN          107180371 A   *   9/2017   ............ G06Q 30/06

OTHER PUBLICATIONS

Mirabueno, Roland. How to Innovate on Your One-Time-Offer Page With a Video. (October 12, 2012) . Retrieved online Sep. 24, 2018. http://www.mindvalleyinsights.com/innovate-on-oto-video/ (Year: 2012).*

*Primary Examiner* — James A Reagan
(74) *Attorney, Agent, or Firm* — Lee & Hayes, P.C.

(57) ABSTRACT

This disclosure presents techniques for selecting an add-on item to present to consumers at a check-out user interface of an electronic marketplace. The selection techniques involve presenting a consumer with a selection of add-on items that are unrelated to items added by the consumer to her shopping cart. The check-out user interface can present the consumer with a one-time offer to add the add-on item to her shopping cart. In some examples, the add-on items can represent over-stocked items or items that a supplier is attempting to liquidate. Further, the selection techniques can minimize the additional labor cost of retrieving the add-on item from a fulfillment center, by selecting add-on items that are located within a close physical proximity to items that the consumer has already added to her shopping cart.

20 Claims, 12 Drawing Sheets

(56) References Cited

U.S. PATENT DOCUMENTS

| | | | |
|---|---|---|---|
| 2010/0218131 A1* | 8/2010 | Holm-Petersen | G06Q 10/087 715/771 |
| 2011/0302030 A1* | 12/2011 | Lore | G06Q 10/06375 705/14.49 |
| 2012/0233028 A1* | 9/2012 | Brown | G06Q 10/00 705/26.81 |
| 2012/0265637 A1* | 10/2012 | Moeggenberg | G06Q 30/02 705/26.8 |
| 2014/0249960 A1* | 9/2014 | Mello | G06Q 30/0623 705/26.61 |
| 2016/0371629 A1* | 12/2016 | Agrawal | G06Q 10/087 |

* cited by examiner

GENERATING ADD-ON ITEM DEALS IN AN ELECTRONIC MARKETPLACE

BACKGROUND

In an electronic marketplace environment, a consumer often searches for particular items or categories of items that meets her needs or interests. By design, menu systems can allow a consumer to focus wholly on their preferred categories of items, and navigate away from other items unrelated to their needs or interests. In doing so, the consumer can be less prone to adding unrelated impulse purchases while shopping for a particular item or while shopping within a particular category of items.

While a targeted menu system can improve a consumer's shopping experience, that same convenience can produce drawbacks for suppliers. Suppliers are often unable to present consumers with a wide variety of items that are unrelated to popular items or popular categories of items that consumers often gravitate towards. As a result, suppliers tend to stock-pile items within fulfillment centers because those items are difficult to present to consumers through an electronic marketplace.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A illustrates a location of items added to a shopping cart of an electronic marketplace, and available add-on items within the fulfillment center.

FIG. 4A illustrates a UI configuration that provides a two-step option to select an add-on item, and submit an order. FIG. 4B illustrates a UI configuration that provides a single-step option to select an add-on item, and submit an order.

DETAILED DESCRIPTION

Figure 1:
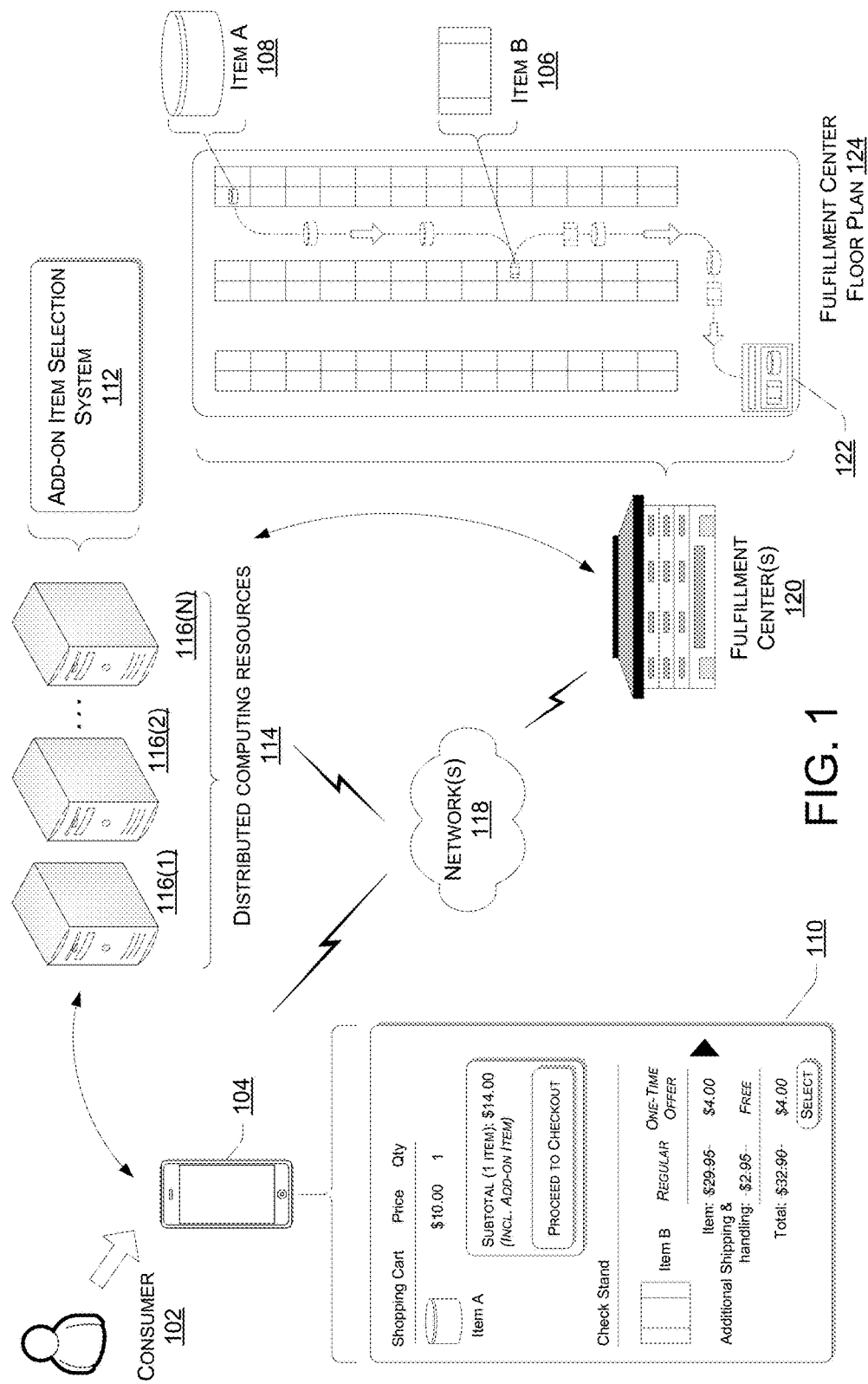
FIG. 1 is a pictorial flow diagram of an example add-on item selection system that illustrates providing a client device with an add-on item at a check-out user-interface of an electronic marketplace.

This disclosure sets forth systems and techniques for selecting an add-on item to present to consumers at a check-out user interface of an electronic marketplace. In a traditional brick-and-mortar retail store, shop owners are able to successfully market products that consumers would not otherwise purchase. Typically, shop owners can entice consumers to make an impulse purchase by displaying products in a display case adjacent to a customer check-out. However, merchants in an electronic marketplace can find it difficult to replicate a similar impulse purchase behavior, particularly since consumers are able to navigate directly to categories of items that relate to their needs and/or interests. Further, unlike retailers, online merchants are unable to display impulse buy items—referred hereinafter as add-on items—in a physical display case adjacent to a customer check-out.

Additionally, merchants using an electronic marketplace are burdened with an additional disadvantage of having to absorb additional labor costs associated retrieving and packaging additional items that consumers may buy on impulse. Unlike a traditional brick-and-mortar retail store, where impulse purchase items are typically displayed at the check-out counter, one or more items specified in each online order may be retrieved or picked, from inventory (which may also be referred to as stock storage) in the fulfillment center (which may also be referred to as a distribution center). Picked items may be delivered or conveyed, if necessary, to one or more stations in the fulfillment center for sorting into their respective orders, packing, and finally shipping to the consumers.

The techniques described herein involve presenting consumers with a selection of add-on items that are unrelated to items added by the consumer to her shopping cart. The selection of add-on items may be presented, without requiring the consumer to navigate away from a User Interface (UI) that facilitates ordering an item that the consumer had already intended to purchase. In a non-limiting example, a UI may present a one-time offer to add an add-on item to a shopping cart at a point in time that the consumer is to submit an order for processing. The UI can be configured such that a consumer need only perform one additional step in selecting an add-on item, and submitting an entire order for processing. Additionally, the UI may be configured such that the consumer need only make one selection to submit an entire order for processing that includes the add-on item. In doing so, this eliminates potential opportunities that may distract the consumer from completing her intended transaction, and this also allows making the impulse buy of the add-on item more attractive.

As used herein, the term "add-on items" is used to describe an inventory item that a supplier intends to present to a consumer without solicitation. The add-on items may be randomly selected and belong to a category of items that are unrelated to items added by a consumer to her shopping cart. For example, an add-on item may be a heavily discounted hygiene product that is randomly selected when a consumer adds a media content item to her shopping cart.

In some examples, an add-on item can represent overstocked items or items that a supplier is attempting to liquidate. In other examples, an add-on item may include an inventory item that belongs to a category of items that receive very low through-traffic on an electronic marketplace. Additionally, an add-on item may include an inventory item in which data may indicate a prospectively high inventory supply based on a pending delivery that is in transit to a fulfillment center. In other examples, an add-on item may include an inventory item that is approaching a 'sell-by-date' or an expiration date. In another example, an add-on item may include a ticket to a live performance or event.

Further the selection techniques described herein can minimize the additional labor cost of retrieving an add-on item at a fulfillment center. Additional labor costs can normally be associated with locating and retrieving an add-on item from a shelving component within a fulfillment center. These costs may be reduced by selecting add-on items that are located within a close physical proximity to items that the consumer has already added to her shopping cart. In doing so, personnel retrieving an add-on item need only expend minimal additional effort in locating and retrieving the add-on item.

In one example, the selection techniques described herein may apply to personnel retrieving an add-on item from a shelving component and delivering the add-on item to a next processing operation. In various examples, the next processing operation may be a nearby receiving station, or sorting and packaging station. Alternatively, or additionally, the next processing operation may correspond to a particular point on a conveyor system that automatically transports the items to a designated receiving station or designated sorting and packaging station.

In another non-limiting example, the selection techniques described herein may apply to an "items-to-personnel scenario" within a fulfillment center, whereby items are delivered by automated machines to personnel at a next processing operation. In various examples, automated machines may select an add-on item that is in "close proximity" to an item that a consumer has added to her shopping cart. As described in more detail below, the term "close proximity" may refer to an add-on item being located on a same shelving component or a nearby shelving component to an item that was added to the shopping cart by the consumer. In cases where an automated machine is used to retrieve items and add-on items, "close proximity" may also refer to items stored on high shelves of a shelving component, which would normally require additional equipment to elevate personnel.

Further, the selection techniques described herein may allow for a selection of a fulfillment center to be at least partly based on an inventory of available add-on items. In a non-limiting example, a particular fulfillment center may store a larger inventory of add-on items with a near-in-time sell-by-date or expiration date. Thus, the financial loss of being unable to sell the inventory of add-on items because the sell-by-date or expiration date has passed may become a factor in selecting one particular fulfillment center over another fulfillment center.

The term "techniques," for instance, may refer to system(s), method(s), computer-readable instructions, module(s), algorithms, hardware logic, and/or operation(s) as permitted by the context described above and throughout the document.

FIG. 1 is a pictorial flow diagram that illustrates a consumer 102 interacting with a client device(s) 104 to add an add-on item 106 to an order for an item 108 from an electronic marketplace. In the illustrated example, the add-on item 106 may be presented to the client device(s) 104 via a check-out user interface 110 of an electronic marketplace. In various examples, the client device(s) 104 may belong to a variety of categories or classes of devices such as traditional server-type devices, desktop computer-type devices, mobile-type devices, special purpose-type devices, embedded-type devices, wearable-type devices, implanted computing devices, personal computers, automotive computers, network-enabled televisions, thin clients, terminals, game consoles, gaming devices, work stations, media players. Thus, client device(s) 104 can include a diverse variety of device types and are not limited to a particular type of device.

In the illustrated example, an add-on item selection system 112 interacts with the client device(s) 104 to present the add-on item 106 on the user interface 110.

The add-on item selection system 112 may operate on one or more distributed computing resources 114. In various examples, the distributed computing resources 114 may include one or more computing device(s) 116 that operate in a cluster or other configuration to share resources, balance load, increase performance, provide fail-over support or redundancy, or for other purposes.

In various examples, the one or more computing device(s) 116 can include one or more interfaces to enable communications with other networked devices, such as client device(s) 104, via one or more network(s) 118. For example, the one or more network(s) 118 can include public networks such as the Internet, private networks such as an institutional and/or personal intranet, or some combination of private and public networks. The one or more network(s) 118 can also include any type of wired and/or wireless network, including but not limited to local area network (LANs), wide area networks (WANs), satellite networks, cable networks, Wi-Fi networks, WiMax networks, mobile communications networks (e.g., 3G, 4G, and so forth) or any combination thereof.

In the illustrated example, the add-on item selection system 112 may further interact with a fulfillment center 120 to identify an add-on item 106 to offer to the consumer at the UI 110. As discussed in further detail below, the add-on item 106 can be identified based on its relative position to the item 108 ordered by the consumer and/or a packaging station 122 on a fulfillment center floor plan 124.

Figure 2A:
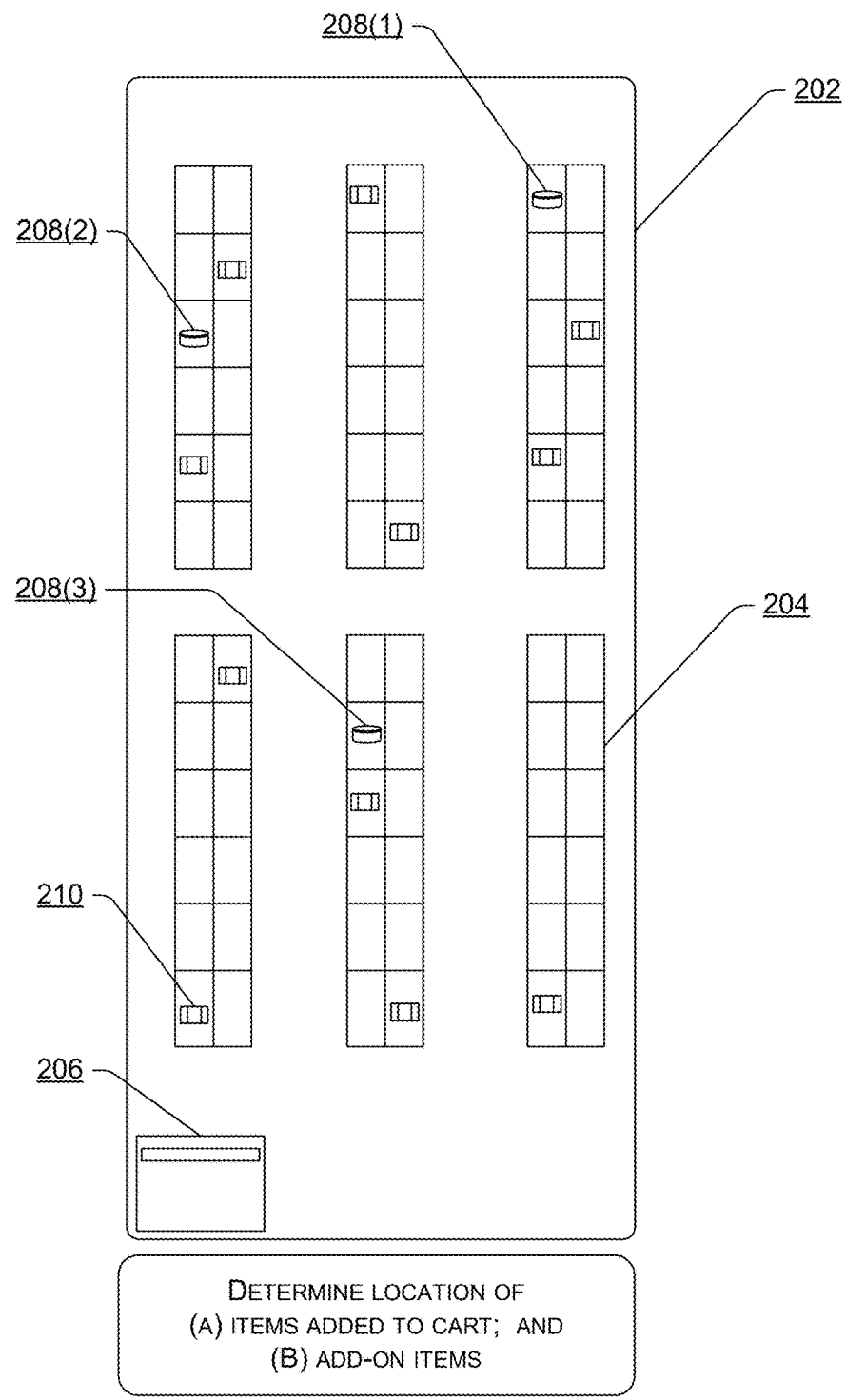
FIGS. 2A through to 2D illustrate a plan view of an exemplary fulfillment center floor-plan, and an exemplary process of selecting an add-on item to add to a consumer shopping cart.

FIGS. 2A through to 2D illustrate a plan view of an exemplary fulfillment center 202 floor-plan. The fulfillment center 202 floor-plan includes multiple rows of shelving 204 to store the inventory of items. Walking aisles between the shelving 204 provides personnel access to the inventory of items. The fulfillment center also includes a sorting/packaging station 206 where selected items are prepared for shipment to consumers. In a non-limiting example, the process of packaging one or more items for shipment to a delivery location involves locating the items within the shelving 204 of the fulfillment center, and re-locating those items to a sorting/packaging station 206, where the items are packaged and prepared for shipment. The position of each individual item within the fulfillment center can be catalogued in an electronic database, so that an exact location can be known at any point in time. In non-limiting examples, identifying an exact location of each individual item may be facilitated by use of a machine-readable optical label, such as a bar code or a QR code, or a radio-frequency tag.

In FIG. 2A, a location of item(s) 208 added to a shopping cart of an electronic marketplace are identified on the fulfillment center 202 floor-plan. In a non-limiting example, identifying the position of items 208 within the fulfillment center also includes identifying a shelf level, rack, or shelf height, and location on that shelf that the item(s) 208 are located. Further, a location of add-on items 210 within the fulfillment center 202 may also be identified. The inventory of add-on items 210 can correspond to items currently overstocked by a supplier, or items that the supplier has earmarked for liquidation. In other examples, the add-on items may correspond to items that are associated with a category of items that are rarely searched by consumers through the electronic marketplace.

Figure 2B:
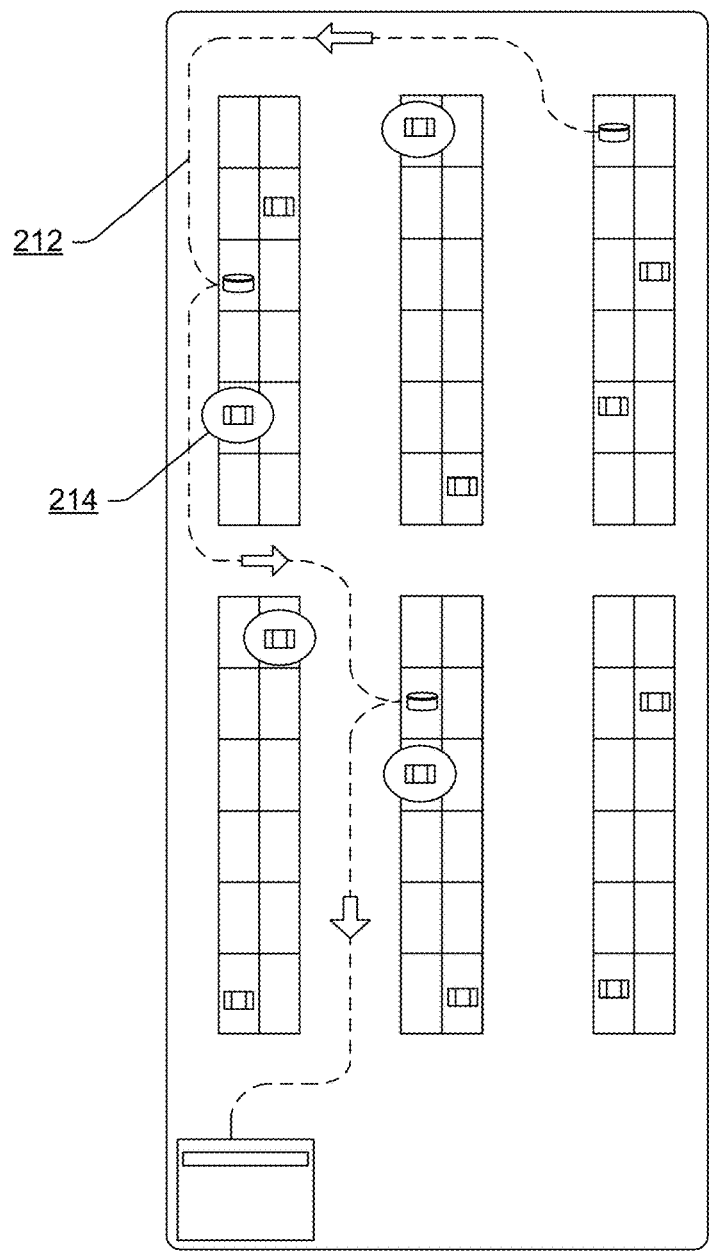
FIG. 2B illustrates a process step of generating a pathway through aisles of the fulfillment center to collect all items added to the shopping cart, while also highlighting add-on items located in close proximity to the pathway.

In FIG. 2B, the add-on item selection system may generate a pathway 212 through the aisles of the fulfillment center 202 that links all items added to an electronic shopping cart of a consumer with a sorting/packaging station 206. The pathway 212 can represent a most time-efficient, and thus cost-efficient, means of personnel retrieving all items for preparation of shipment. In doing so, the add-on item selection system may also identify a subset of add-on items 214 from the inventory of add-on items 210 that are located within a close proximity to the pathway 212 through the aisles of the fulfillment center 202.

The term "close proximity," may refer to the proximity of the add-on items 210 to the pathway 212 along the aisles of the fulfillment center 202. That is, add-on items 210 may be in close proximity to the pathway 212 in cases where the pathway 212 simply passes shelving 204 that stores the add-on items 210. For example, in a scenario where personnel retrieve items from a shelving component with the fulfillment center, add-on items 210 that are in "close proximity" to the pathway may also refer to the add-on items 210 being located at a same, or similar, shelf height to an item that was added to the shopping cart by the consumer. This additional distinction may be helpful in cases where an item(s) 208 is stored on a high shelf that may require additional equipment to elevate personnel. Thus, it would be beneficial to further identify an add-on item 210 that is located at a similar height or lower height. In doing so, this may limit additional labor efforts, and ultimately labor costs.

Alternatively, or additionally, in an items-to-personnel scenario, where automated machines may deliver items to personnel at a next processing operation, the term "close proximity" may refer to items on a same shelving component or an adjacent shelving component, irrespective of relative shelf height. In other words, an automated machine is unlikely to expend a significant amount of additional labor in retrieving an add-on item at a high shelf position, when the item added to the shopping cart by the consumer is located at a lower relative shelf position.

Figure 2C:
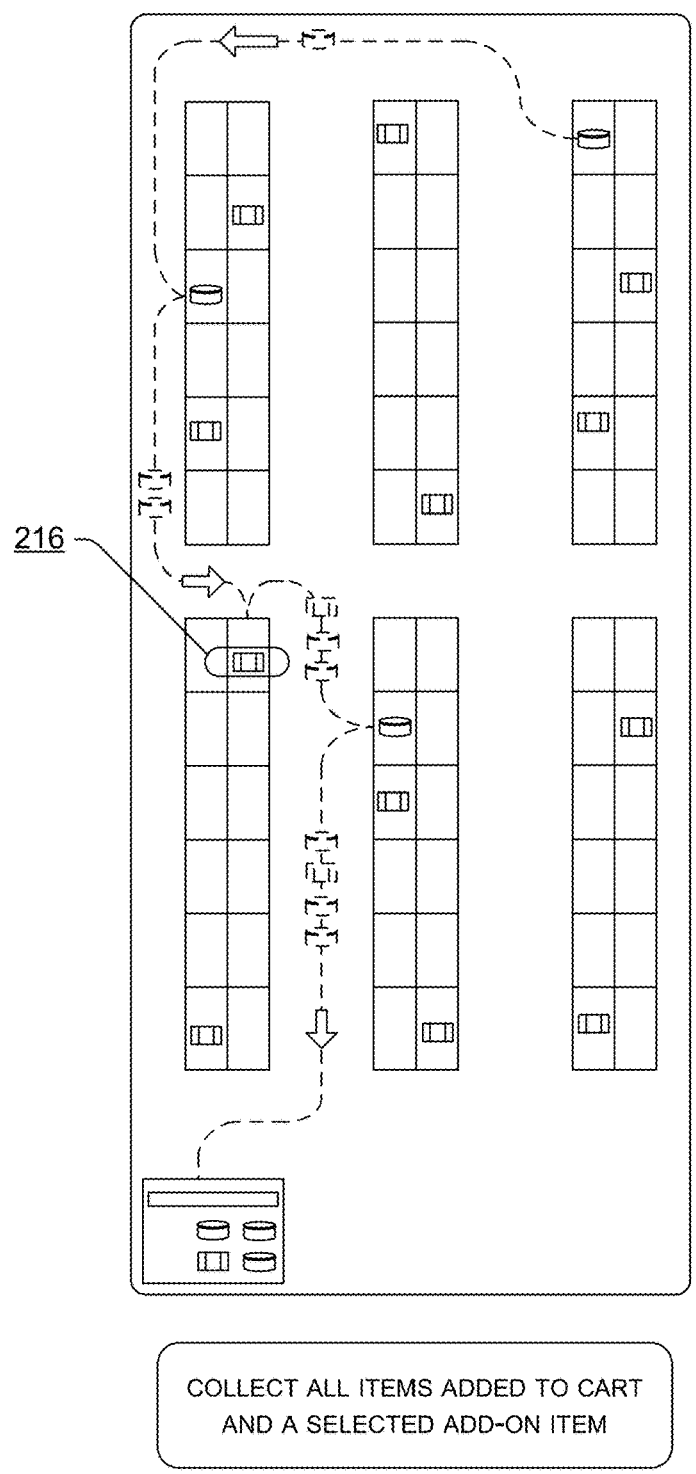
FIG. 2C illustrates a process step of collecting all items added to the shopping cart, including a selected add-on item.

Therefore, the add-on item selection system may offer the subset of add-on items 214 to a consumer via the electronic marketplace. In doing so, the add-on item selection system may receive an indication that a consumer has selected a particular add-on item 216 for purchase with item(s) 208. FIG. 2C illustrates a process step of collecting item(s) 208 added to the consumer cart and a selected add-on item. In this process step, it is envisaged that personnel can expend minimal additional effort in adding the selected add-on item 216 to packaging for the item(s) 208.

Figure 2D:
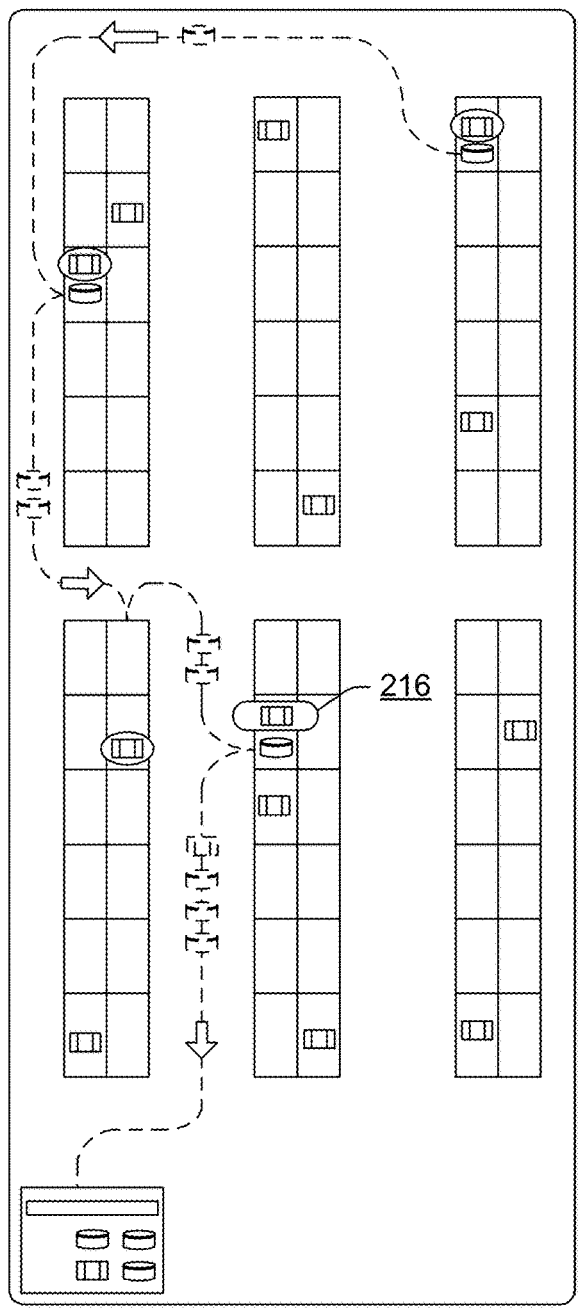
FIG. 2D illustrates an alternative process of identifying and selecting add-on items that are located on an adjacent shelving component to the items added to the shopping cart.

FIG. 2D illustrates an alternative process of identifying and selecting add-on items that are located on an adjacent shelving component to the item(s) 208 added to the consumer cart. A benefit in selecting add-on item(s) 214 from an adjacent shelving component is that personnel are not required to make an additional stop along the pathway 212 between item(s) 208 and a next processing operation. In doing so, additional labor efforts can be minimized in collecting and packaging the selected add-on item 216 with the item(s) 208. In various examples, the term "adjacent shelving component" may describe a shelving component that is above, below, or diagonally opposite a shelving component that stores the item(s) 208. In other examples, "adjacent shelving component" may also describe a shelving component that is on an opposite side of a same aisle in which the item(s) 208 is stowed.

Figure 3:
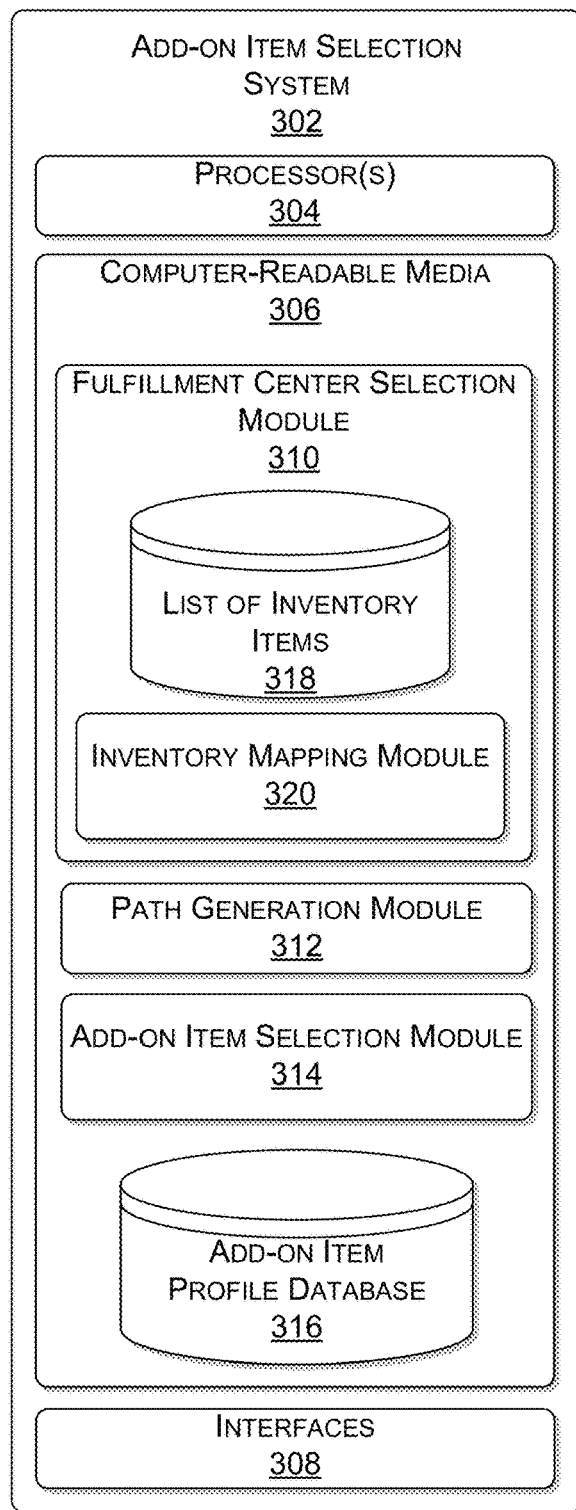
FIG. 3 illustrates a block diagram of components of an example add-on item selection system.

FIG. 3 illustrates a block diagram of components of an example add-on item selection system 302. The add-on item selection system 302 can include one or more processor(s) 304 operably connected to the computer-readable media 306. The add-on item selection system 302 can also include one or more interfaces 308 that enable communication with other networked devices, such as a client device and one or more fulfillment centers. The one or more interfaces 308 can include network interface controllers (NICs), I/O interfaces, or other types of transceiver devices to send and receive communications over a network.

The computer-readable media 306 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the computer-readable media 306 can include a fulfillment center selection module 310, a path generation module 312, an add-on item selection module 314, and an add-on item profile database 316. In the illustrated example, the fulfillment center selection module 310 may identify multiple fulfillment centers that are capable of satisfying a particular consumer order, based at least in part on items placed in a shopping cart by the consumer in an electronic market place. The fulfillment center selection module 310 may identify fulfillment centers based on proximity to the delivery location indicated by the consumer, current labor and shipping capacities, and an availability of all inventory items that the consumer has added to her shopping cart.

In the illustrated example, the fulfillment center selection module 310 may include a list of inventory items 318. The list of inventory items 318 includes all items stored at a given point in time within the fulfillment center. The list of inventory items 318 can be updated, in real-time, in response to fulfillment of a consumer order, receipt of a pending consumer order, or delivery or receipt of a supplier delivery of new inventory for storage. Further, the list of inventory items 318 includes an "add-on item" designation for at least a subset of inventory items.

In the illustrated example, the fulfillment center selection module 310 may also include an inventory mapping module 320. The inventory mapping module 320 may identify the position of each individual inventory item within the fulfillment center. In some examples, the inventory mapping module 320 may be updated, in real-time, in response to fulfillment of a consumer order, receipt of a pending consumer order, or storage of new inventory received from a supplier delivery to the fulfillment center. In some examples, the position of inventory items can be catalogued in an electronic database to provide efficient search and retrieval capability. In a non-limiting example, identifying an exact location of each individual item may be facilitated by use of a machine-readable optical label, such as a bar code or a QR code, or a radio-frequency tag/receiver. In some examples, identifying the position of inventory items within the fulfillment center also includes identifying a shelf aisle or shelf row, a shelf level, a rack level, or bin designation.

In the illustrated example, the computer-readable media 306 further includes a path generation module 312. The path generation module 312 may generate a pathway through the aisles of a selected fulfillment center to link all items added to an electronic shopping cart of a consumer, with a sorting and packaging station within the fulfillment center. The pathway can represent a most time-efficient, and thus cost-efficient, means of personnel retrieving all items for preparation of a package for shipment.

In the illustrated example, the computer-readable media 306 can further include an add-on item selection module 314. The add-on item selection module 314 can select one or more add-on items from the inventory of items to present to a consumer at an electronic check-out user interface. In various examples, the add-on item selection module 314 may identify a subset of add-on items from the inventory of items that are located in close proximity to the pathway through the aisles of the fulfillment center that links all items added to the shopping cart by the consumer.

In the illustrated example, the computer-readable media 306 can further include an add-on item profile database 316. In various examples, the add-on item profile database 316 may identify particular associations between types of add-on items, and consumer demographics, as well as other environmental conditions related to the transaction. Since the add-on items are selected randomly and may not be related to the items added to the shopping cart by the consumer, other metrics can be used to determine whether a sale of an add-on item is successful. For example, the add-on item profile database 316 may record a time of day, or day of the week that particular add-on items are most often added to a shopping cart. Further, recording a relationship between a category of add-on items and a category of items added to a shopping cart by a consumer may evince a seemingly unknown relationship between two unrelated categories of items. For example, consumers may be induced to add hygiene products when buying particular types of media. In some examples, the add-on item profile database 316 can be used to select particular add-on items for particular unrelated items. Further, based on identifying relationships between particular add-on items and other categories of items added to a shopping cart by a consumer, the add-on item profile database 316 can be used to suggest a revised mapping model of inventory within a fulfillment center.

Figure 4A:
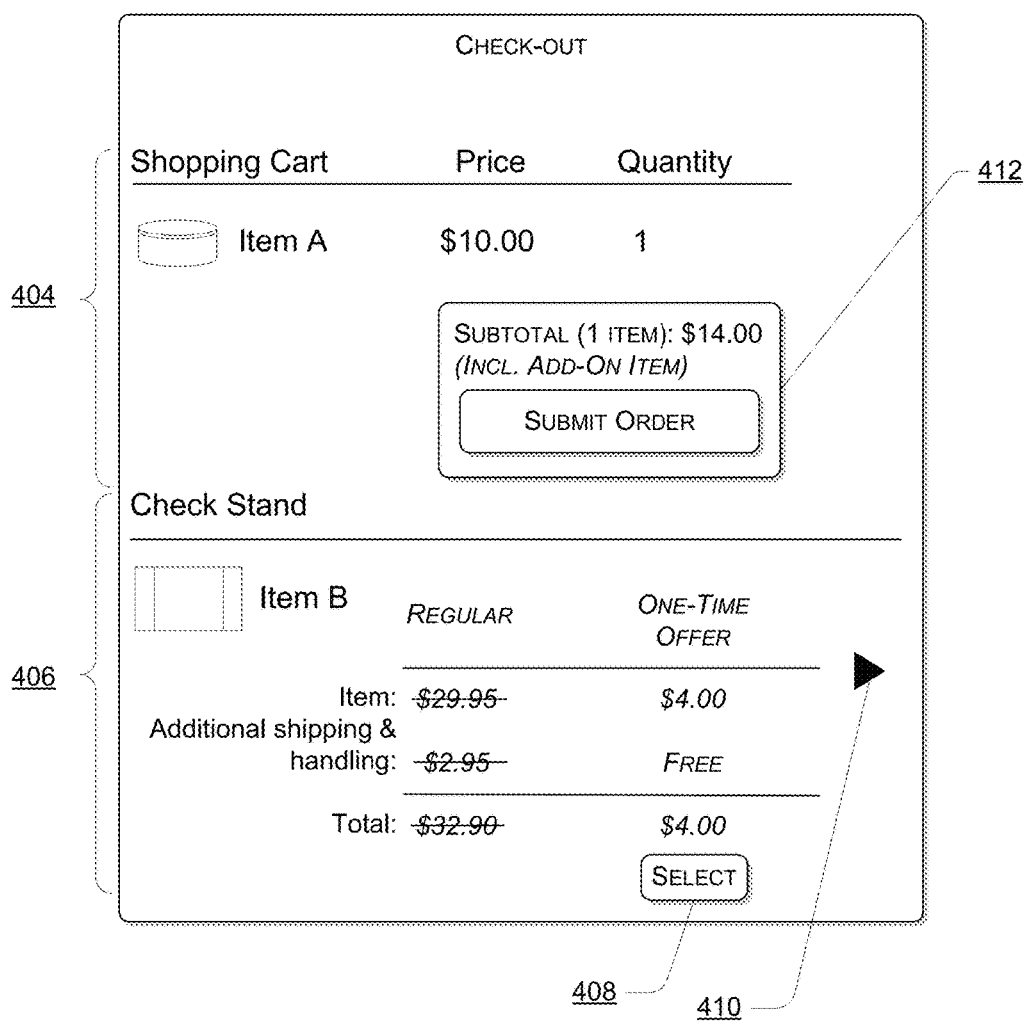
FIGS. 4A and 4B illustrate an example user interface (UI) that presents a consumer with a shopping cart that includes items added by the consumer, along with an unsolicited add-on item.

FIG. 4A illustrates a user interface (UI) 402 that provides a two-step option to select an add-on item, and submit an order for processing. Particularly, the UI 402 presents a consumer shopping cart window 404 along with an add-on item selection (e.g., check-stand) window 406. It is noteworthy that the shopping cart window 404 and check-stand window 406 are presented on the UI 402 at the same time, thus a consumer may add the add-on item to her shopping cart and process the final order without having to navigate away from the UI 402, thereby eliminating potential opportunities that may distract the consumer from submitting the order.

In the example presented in FIG. 4A, the add-on item selection window 406 presents "Item B" as an add-on item, and illustrates a marked-down regular price of $4 as a "one-time offer." Further, a "select" button 408 is included in the UI 402 to provide the consumer with a means to add the add-on item to her shopping cart, prior to submitting the order for processing. A selectable "toggle" button 410 allows the consumer to view other add-on items that may be available from the fulfillment center. Note that the selectable "toggle" button 410 is available in only one direction, which reflects the time-limited nature of the "one-time offer." Once the consumer has pressed the "toggle" button 410, they will be unable to retrieve the one-time offer associated with "Item B" as illustrated in FIG. 4A. In some examples, the UI 402 may present a particular add-on item for a predetermined period of time. Further, the UI 402 may include a count-down timer that displays a time remaining before the add-on item may no longer be available. At an expiration of the period of time, the "select" button 408 may disappear, or a different add-on item may appear and the count-down timer may restart.

In an alternative embodiment, a second selectable "toggle" button that points in a direction opposite to the "toggle" button 410 may be provided. In this example, the second selectable "toggle" button may allow the consumer to view a select number of add-on items that may have been previously presented to the consumer via the user interface 402. In some examples, the second selectable "toggle" button may only allow the consumer to preview a limited number of add-on items that have been previously presented. A selection to preview a previously presented add-on item may present the consumer with the same "one-time offer" that was displayed during the original presentation on the user interface 402. In other examples, the consumer may be presented with a different "one-time offer" for the previously presented add-on item. The different "one-time offer" may include a less significant discount to the "one-time offer" that was originally displayed. By presenting a different "one-time offer," the consumer may be more inclined to select the add-on item when it is originally presented on the user interface 402, knowing that the same "one-time offer" for the add-on item may not be available even though the consumer may still have an option to later select the add-on item.

In the event that a consumer adds the add-on item to her shopping cart, via the "select" button 408, an additional subtotal window 412 is dynamically updated with a new total that reflects the addition of the add-on item. In the example illustrated in FIG. 4A, the new total of $14 includes the cost of Item A, $10, and the cost of the add-on item B, $4.

Figure 4B:

FIG. 4B illustrates a UI configuration 414 that provides a single-step option to add the add-on item to the cart and submit an order. Rather than including a "select" button 408 to add the add-on item to a shopping cart, the UI 414 includes two separate "submit order" buttons with respective sub-totals that exclude the add-on item and include the add-on item. Doing so eliminates the second step of adding the add-on item to the order, thereby eliminating a potential opportunity that may distract the consumer from submitting the order.

Figure 5:
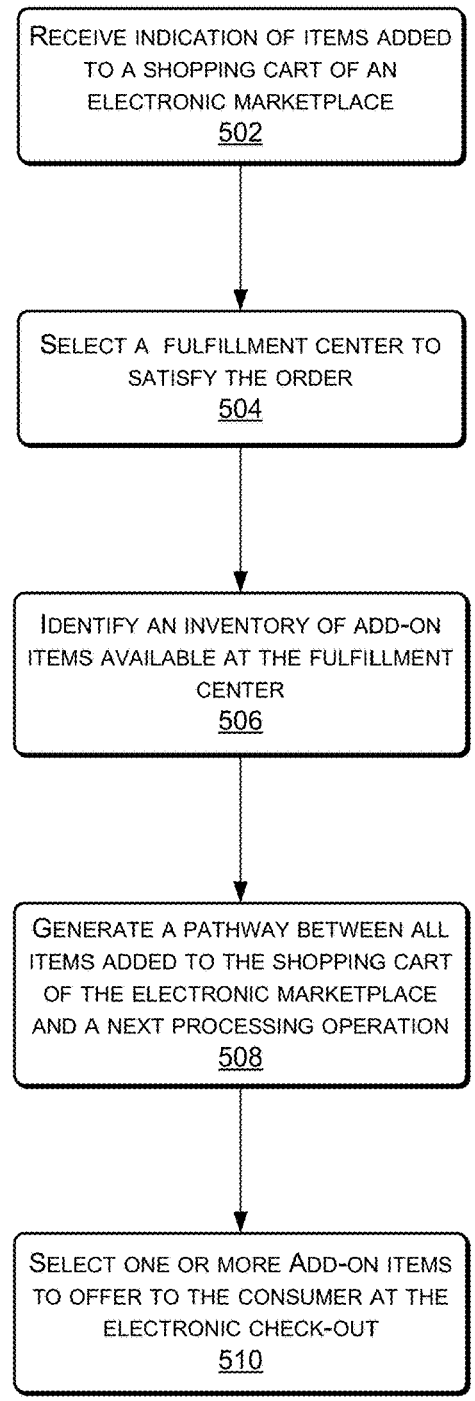
FIG. 5 illustrates a flow diagram of an add-on item selection system receiving an indication of an item added to a cart of an electronic marketplace, and selecting one or more add-on items to offer to the consumer at the check-out.

FIG. 5 illustrates a flow diagram of a process for selecting a fulfillment center to satisfy a consumer order based on the additional cost of including an add-on item. The additional cost can relate to labor costs associated with locating and retrieving the add-on item from shelving within the fulfillment center, as well as additional specialty packaging that may be required to ship the add-on item.

At 502, the add-on item selection system can receive an indication that a consumer has added items to a shopping cart of an electronic marketplace. In some examples, the indication may be received at a time when the consumer authenticates herself to the electronic marketplace and adds items to her shopping cart while continuing with her shopping experience. In other examples, the indication may be received at the check-out user interface at a time when the consumer authenticates herself for the first time.

At 504, the add-on item selection system can select a fulfillment center to satisfy the order. The selection of the fulfillment center can be based on attributes such as a geographic proximity to the delivery location, and inventory levels of the items that the consumer has added to her shopping cart. In some examples, a current labor and shipping capacity may factor into the selection of a fulfillment center.

At 506, the add-on item selection system can identify an inventory of add-on items available at the selected fulfillment center. The inventory of add-on items can correspond to items currently overstocked by a supplier, or items that the supplier has earmarked for liquidation. In other examples, the add-on items may correspond to items that are associated with a category of items that are rarely searched by consumers through the electronic marketplace.

At 508, the add-on item selection system can generate a pathway through the fulfillment center that links all items added to an electronic shopping cart with a next processing operation. In a non-limiting example, a next processing operation may involve manually delivering the items to a nearby receiving station, or sorting and packaging station. In another non-limiting example, a next processing operation may involve delivering the items to a particular point on a conveyor system that automatically transports the items to a designated receiving station or designated sorting and packaging station. In this example, personnel within the fulfillment center may be required to collect items associated with multiple consumer orders during a single walk-through of fulfillment center aisles. Thus, a next processing operation may involve offloading a first set of items associated with a first consumer order onto a conveyor system while beginning a second process of collecting a second set of items for a second consumer order. Thus, the pathway that is generated can represent a most time-efficient, and thus cost-efficient, means of retrieving all items for one or multiple consumer orders during a single walk-through of the fulfillment center aisles.

At 510, the add-on item selection system can select one or more add-on items along the pathway to offer to the consumer at the electronic check-out. By selecting an add-on item that is within close proximity to the pathway, the labor costs of retrieving the additional add-on item can be minimized.

Figure 6:
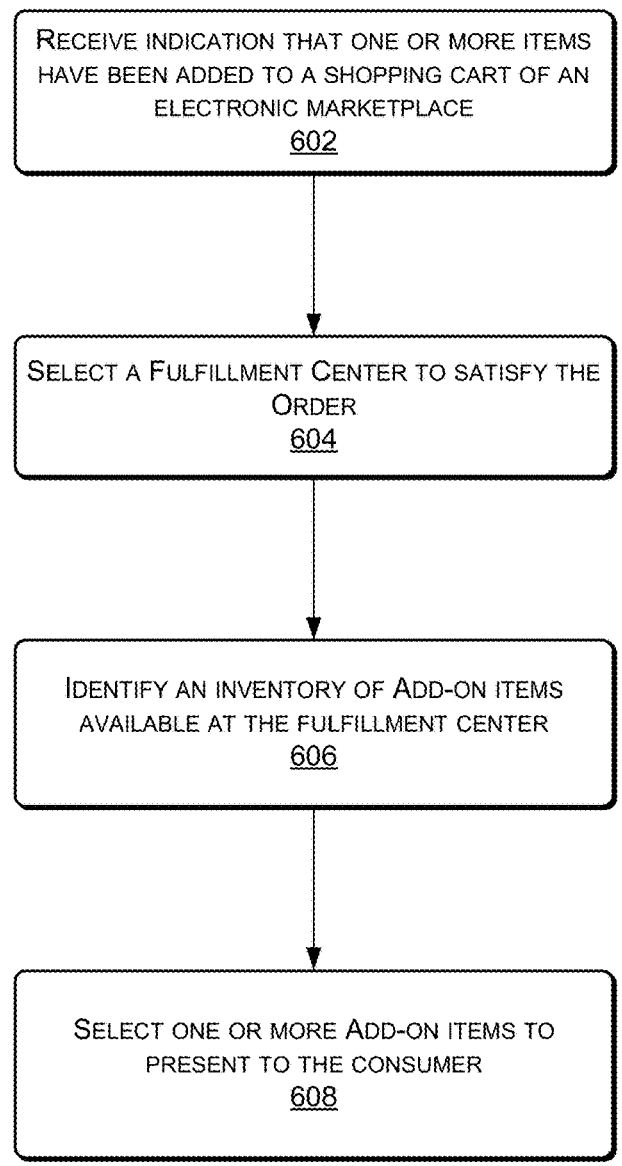
FIG. 6 illustrates a flow diagram of an add-on item selection system identifying an inventory of add-on items in a fulfillment center and selecting an add-on item to present to the consumer at the check-out.

FIG. 6 illustrates a flow diagram of identifying an inventory of add-on items in a fulfillment center and selecting an add-on item to present to the consumer at the check-out of the electronic marketplace. The add-on item selection system may consider many factors in selecting an appropriate add-on item. In a non-limiting example, the add-on item selection system may select an add-on item that belongs to a category of items that is unrelated to the items already in the consumer shopping cart. This ensures that a potential purchase opportunity that is related to the consumer's current buying habits has not been heavily discounted. In another non-limiting example, the add-on item selection system may select an add-on item that is discounted to a price that is less than the cost of items already added to the consumers shopping cart.

At 602, the add-on item selection system receives an indication that a consumer has added an item to her shopping cart in an electronic marketplace. In some examples, the indication may be received at a point in time after the consumer authenticates herself to the electronic marketplace.

At 604, the add-on item selection system can select a fulfillment center to satisfy the order. The selection of the fulfillment center can be based on attributes such as a geographic proximity to the delivery location, and inventory levels of the items that the consumer has added to her shopping cart.

At 606, the add-on item selection system can identify an inventory of add-on items available at the fulfillment center. In a non-limiting example, an inventory item may be designated as an add-on item at a point in time when the rate of sale of the inventory item is below a particular threshold. In another example, an inventory item may be designated as an add-on item in response to an expiration date or a sell-by-date being close in time.

At 608, the add-on item selection system can select one or more add-on items to present to the consumer. In a non-limiting example, a selection may be based on a discounted purchase price of the add-on item being less than a price of a particular item, or all items, that the consumer has added to her shopping cart. In another non-limiting example, a selection may be based on a type of packaging that is required for the items that the consumer has added to her shopping cart. If a consumer has added perishable foods as items to her shopping cart, then an add-on item that can be included in that same packaging may be selected.

Figure 7:
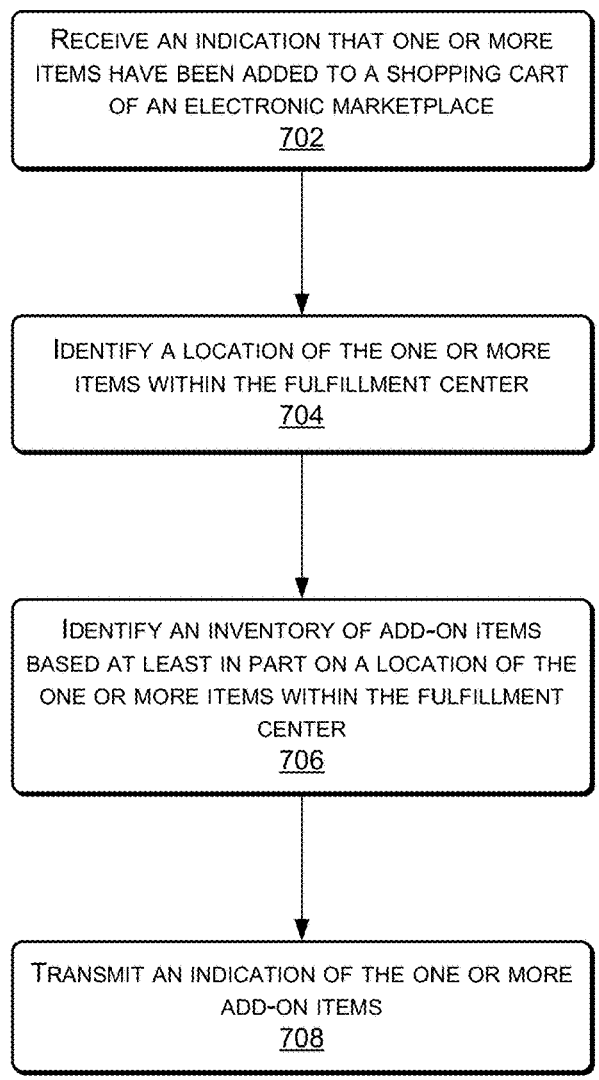
FIG. 7 illustrates a flow diagram of an add-on item selection system generating a pathway to retrieve an item from within a fulfillment center and selecting an add-on item, which is stowed along the pathway, to present to the consumer at the check-out.

FIG. 7 illustrates a flow diagram of first generating a pathway to retrieve an item from within a fulfillment center and selecting an add-on item to present to the consumer at the check-out of the electronic marketplace that is stowed along the pathway. In a non-limiting example, rather than using the entire pathway to locate add-on items, the add-on items may be located in close proximity to the item added to the cart by the consumer. In some examples, items that are in close proximity may refer to add-on items being located on a same shelving component as the item added to the cart by the consumer, or a shelving component that is nearby the item. In doing so, additional labor costs associated with retrieving the add-on item can be minimized by eliminating a need for personnel to make an additional stop along the pathway to retrieve the add-on item.

At 702, the add-on item selection system can receive an indication that a consumer has added one or more items to a shopping cart of an electronic marketplace. In some examples, the indication may be received at a point in time after the consumer authenticates herself to the electronic marketplace. Further, the add-on item selection system can select a fulfillment center to satisfy the order based on inventory levels of the one or more items added to the shopping cart, as well as current labor and shipping capabilities.

At 704, the add-on item selection system can identify a location of the one or more items within the selected fulfillment center, and generate a pathway between the one or more items and a storing/packaging station. The pathway can represent a most time-efficient, thus cost-efficient means of retrieving all items for packaging.

At 706, the add-item selection system can identify and select one or more add-on items that are stowed in close proximity to the items added to the shopping cart by the consumer. In some examples, the add-on items may be located on a same shelving component, a diagonally opposite shelving component, or a shelving component that is above or below the shelving component of the items added to the shopping cart by the consumer. In other examples, the add-on items may be located on an adjacent shelving component that is close to the items added to the shopping cart, such that personnel within the fulfillment center are only required to expend minimal additional labor effort to locate and retrieve the add-on items. In a non-limiting example, the add-on items can be dynamically identified based on available data for inventory in close proximity to items added to the shopping cart. For example, data for inventory may identify particular items within the inventory of items as candidates for add-on items based on unreasonably high inventory supply, or a prospectively high inventory supply due to a pending delivery. In other examples, the data for inventory may also indicate that particular inventory items may be identified as approaching a sell-by-date, thus making them suitable candidates for being offered to a consumer as an add-on item.

At 708, the add-item selection system can transmit an indication to a device associated with the consumer that presents the one or more add-on items on a user interface. In a non-limiting example, the indication may also include an order in which the add-on items should be presented on the user interface. For example, the add-on item selection system may identify a first add-on item and a second add-on item, such that in response to the consumer selecting a toggle button after viewing the first add-on item, a display of a second add-on item may replace the display of the first add-on item. In a non-limiting example, the order in which the add-on items are presented on the user interface may be based on a ranking of the add-on items by the add-on item selection system. In various examples, the ranking may be based on the same initial selection criteria used to first identify and retrieve the add-on items within the fulfillment center. An order of presenting the add-on items may be based on relative inventory supplies or relative sell-by dates. For example, a particular add-on item with an unreasonably high inventory supply may have a high ranking order relative to other add-on items with lower inventory supplies. Thus, a higher ranking order may increase a likelihood that the particular add-on item will be added to the shopping cart by the consumer, thereby decreasing the unreasonably high inventory supply. Further, a particular add-on item with an approaching sell-by-date may have a high ranking order relative to other add-on items, in an attempt to mitigate incurring losses due to spoilt add-on items. In another non-limiting example, the order of presenting the add-on items may be based on relative profit margins of each add-on item, or a mitigation of losses that may be incurred by the add-on items.

In other examples, rather than presenting the add-on items in a ranked order, the add-on items may be randomly selected for display on the user interface of the consumer device.

Figure 8:
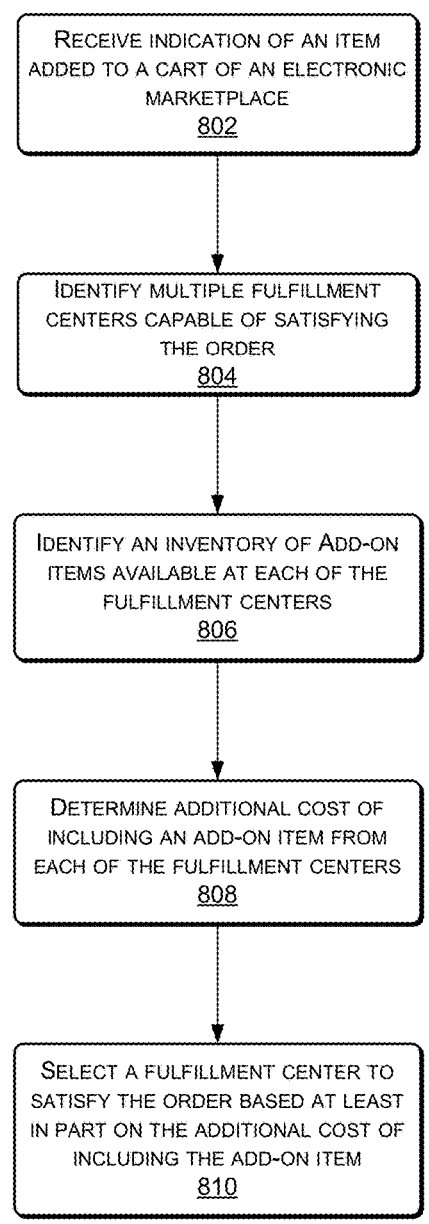
FIG. 8 illustrates a flow diagram of an add-on item selection system selecting a fulfillment center to satisfy an order based on the additional cost of including an add-on item.

FIG. 8 illustrates a flow diagram of a process for selecting a fulfillment center to satisfy a consumer order based on the additional cost of including an add-on item. This process allows the add-on item selection system to prioritize a selection of a fulfillment center based on an inventory of add-on items. In a non-limiting example, a particular fulfillment center may store an inventory of add-on items with a near-in-time sell-by-date. Thus, the financial loss of being unable to sell the inventory of add-on items because the sell-by-date has passed may become a factor in selecting one particular fulfillment center over another fulfillment center.

At 802, the add-on item selection system receives an indication that a consumer has added an item to her shopping cart in an electronic marketplace. In some examples, the indication may be received at a point in time after the consumer authenticates herself to the electronic marketplace.

At 804, the add-on item selection system can identify multiple fulfillment centers that are capable of satisfying the order of the items placed in the shopping cart. In a non-limiting example, the fulfillment centers can be identified based on proximity to the delivery location indicated by the consumer, current labor and shipping capacities, and an availability of the all inventory items added to the shopping cart.

At 806, the add-on item selection system can identify an inventory of add-on items available at each of the multiple fulfillment centers. In a non-limiting example, the inventory of add-on items is designated as such at a point in time when the rate of sale is below a particular threshold, or an expiration of a sell-by-date is becoming closer in time.

At 808, the add-on item selection system can determine, for each of the fulfillment centers, the additional cost of including an add-on item with the fulfillment of the order. The additional cost can include attributes such as labor costs of retrieving all items and an add-on item within a fulfillment center, and shipping the packaged order from the fulfillment center to the delivery location. Other additional costs may also include money saved by being able to sell an add-on item, rather than having the add-on item being discarded because a sell-by-date has passed.

At 810, the add-on item selection system can select a particular fulfillment center from the multiple fulfillment centers to satisfy the order, based at least in part on the additional cost of including the add-on item. In a non-limiting example, an ability to deliver the order within a predetermined time frame may also factor into selecting the particular fulfillment center.

CONCLUSION

Although the subject matter has been described in language specific to structural features and/or methodological acts, it is to be understood that the subject matter defined in the appended claims is not necessarily limited to the specific features or acts described herein. Rather, the specific features and acts are disclosed as illustrative forms of implementing the claims.

What is claimed:

1. A computer-implemented method, comprising:
    under control of one or more processors;
    receiving, from a user device associated with a user, a first indication that an item has been added to a check-out cart of an electronic marketplace;
    identifying a delivery location for fulfillment of the item based at least in part on a user profile associated with the user of the user device;
    identifying a fulfillment center associated with the electronic marketplace to fulfill a delivery of the item based at least in part on the item and the delivery location;
    accessing a data store associated with the fulfillment center, the data store including at least mapping information for an inventory of items and at least one packaging station within the fulfillment center, the inventory of items including the item;

generating a pathway for retrieving the item within the fulfillment center based at least in part on the mapping information, the pathway defined by at least:
 a first position within the fulfillment center that corresponds to a location of the item; and
 a second position that corresponds to a location of the at least one packaging station within the fulfillment center;

selecting an add-on item from the inventory of items, wherein the add-on item is stowed along the pathway;

determining a one-time offer for a purchase of the add-on item, the one-time offer being at least one of a discounted price for the add-on item or a discounted shipping cost for at least one of the item or the add-on item;

causing display of a user interface on the user device, the user interface presenting a second indication of the item that has been added to the check-out cart, and a third indication of a currently offered deal, the third indication displaying the add-on item with the one-time offer as the currently offered deal, the third indication including a first selectable option to replace the add-on item with a different add-on item selected from the inventory of items as the currently offered deal and a second selectable option to choose for purchase the currently offered deal;

at least in part in response to first user input on the first selectable option, terminating the one-time offer and replacing the add-on item with the different add-on item and a new one-time offer as the currently offered deal in the third indication of the user interface; and at least in part in response to second user input on the second selectable option, processing a transaction for fulfillment of the item and the currently offered deal.

2. The computer-implemented method of claim 1, wherein selecting the add-on item from the inventory of items, further comprises:
 identifying a plurality of add-on items from the inventory of items that are stowed along the pathway; and
 wherein selecting the add-on item from the inventory of items comprises randomly selecting the add-on item from the plurality of add-on items.

3. The computer-implemented method of claim 1, wherein the add-on item is a first add-on item and causing the user interface on the user device to present the third indication of the add-on item occurs in a first session of the user interacting with the check-out cart;
 determining that the user is interacting with the check-out cart in a second session;
 selecting the different add-on item; and
 causing the user interface on the user device to present the different add-on item as the offered add-on item in the third indication during the second session.

4. The computer-implemented method of claim 1, wherein selecting the add-on item from the inventory of items is further based at least in part on the add-on item being within a lower shelving component at the first position that corresponds to the location of the item.

5. The computer-implemented method of claim 1, further comprising:
 identifying over-stocked inventory items from the inventory of items;
 determining a subset of the over-stocked inventory items that are located along the pathway; and
 wherein selecting the add-on item from the inventory of items further comprises selecting the add-on item from the subset of the over-stocked inventory items.

6. A system, comprising:
 one or more processors; and
 memory coupled to the one or more processors, the memory including one or more modules that are executable by the one or more processors to:
  receive, from a user device associated with a user, a first indication that an item has been added to a check-out cart of an electronic marketplace;
  identify a fulfillment center associated with the electronic marketplace to fulfill a delivery of the item, based at least in part on a delivery location of the item;
  determine a location of the item within the fulfillment center based at least in part on mapping information of the fulfillment center;
  identify an add-on item from an inventory of items within the fulfillment center, based at least in part on the location of the item;
  determine a one-time offer for a purchase of the add-on item;
  cause a display of a user interface on the user device, the user interface to present a second indication of the item that has been added to the check-out cart, and a third indication of a currently offered deal, the third indication displaying the add-on item with the one-time offer as the currently offered deal, the third indication including a first selectable option to replace the add-on item with a different add-on item selected from the inventory of items as the currently offered deal and a second selectable option to choose for purchase the currently offered deal; and
  at least in part in response to first user input on the first selectable option, terminate the one-time offer and replace the add-on item with the different add-on item and a new one-time offer as the currently offered deal in the third indication of the user interface.

7. The system of claim 6, wherein the one or more modules are further executable by the one or more processors to:
 identify a position within the fulfillment center that corresponds to a next processing operation, based at least in part on the mapping information of the fulfillment center, the next processing operation corresponding to dropping off the item onto at least one of a conveyor system, a receiving station, or a sorting and packaging station;
 generate a pathway from the location of the item to the position that corresponds to the next processing operation, based at least in part on the mapping information of the fulfillment center, and
 wherein to identify the add-on item from the inventory of items is further based at least in part on a proximity of the add-on item to the pathway.

8. The system of claim 6, wherein the fulfillment center is a first fulfillment center, the add-on item is a first add-on item, and wherein the one or more modules are further executable by the one or more processors to:
 determine a first cost of including the first add-on item with the delivery of the item;
 identify a second fulfillment center to fulfill the delivery of the item based at least in part on the delivery location of the item;

identify a second add-on item at the second fulfillment center based at least in part on a location of the item within the second fulfillment center; and determine a second cost of including the second add-on item with the delivery of the item, wherein to identify the fulfillment center associated with the electronic marketplace includes selecting the first fulfillment center based at least in part on the first cost being less than the second cost.

9. The system of claim 8, wherein to determine the first cost and the second cost further comprises one or more processors to:

determine at least one of additional labor costs associated with retrieving and packaging the first add-on item and the second add-on item, or additional shipping costs associated with delivering the first add-on item and the second add-on item.

10. The system of claim 8, wherein the first add-on item includes a sell-by-date; and wherein the first cost of including the first add-on item is further based at least in part on a loss of value caused by an expiration of the sell-by-date.

11. The system of claim 6, wherein the add-on item from the inventory of items is unrelated to a category of items associated with the item added to the check-out cart of the electronic marketplace.

12. The system of claim 6, wherein the add-on item is a first add-on item, and wherein the one or more modules are further executable by the one or more processors to:

identify a second add-on item of the inventory of items based at least in part on the location of the item; and cause the user interface on the user device to present an additional selectable option to select the second add-on item.

13. The system of claim 12, wherein the first add-on item is made unavailable for selection in response to receipt of a user input that corresponds to the additional selection option.

14. One or more non-transitory computer-readable media storing computer-executable instructions that, when executed on one or more processors, perform acts comprising:

receiving, from a server by a fulfillment center, a first indication of an item that a consumer has added to a check-out cart of an electronic marketplace;

determining a location of the item within the fulfillment center;

selecting at least one add-on item from an inventory of items within the fulfillment center, based at least in part on the location of the item;

causing a display of a user interface on a device of the consumer, the user interface to present a second indication of the item that has been added to the check-out cart, and a third indication of a currently offered deal, the third indication displaying the add-on item with the one-time offer as the currently offered deal, the third indication including a selectable option to replace the add-on item with a different add-on item selected from the inventory of items as the currently offered deal; and at least in part in response to first consumer input on the selectable option, terminating the one-time offer and replacing the add-on item with the different add-on item and a new one-time offer as the currently offered deal in the third indication of the user interface.

15. The one or more non-transitory computer-readable media of claim 14, wherein selecting the at least one add-on item is further based at least in part on a price of the at least one add-on item being within a predetermined price range of a price of the item.

16. The one or more non-transitory computer-readable media of claim 14, further comprising:

identifying a first category of items that corresponds to the item added to the check-out cart;

identifying a second category of items that corresponds to the at least one add-on item; and wherein selecting the at least one add-on item is further based at least in part on the first category of items being different from the second category of items.

17. The one or more non-transitory computer-readable media of claim 14, further comprising:

receiving, a third indication that the consumer has ended a first session of interacting with the check-out cart and has commenced a second session of interacting with the check-out cart;

selecting an additional add-on item from the inventory of items that is different from the least one add-on item; and transmitting, to the server, a fourth indication of the additional add-on item.

18. The one or more non-transitory computer-readable media of claim 14, further comprising:

determining a first weight of the item added to the check-out cart; and wherein selecting the at least one add-on item is further based at least in part on the first weight.

19. The one or more non-transitory computer-readable media of claim 14, further comprising:

generating candidate add-on items from the inventory of items within the fulfillment center; and wherein, selecting the at least one add-on item is further based at least in part on a random selection of the at least one add-on item from the candidate add-on items.

20. The one or more non-transitory computer-readable media of claim 14, further comprising:

determining that the item added to the check-out cart of the electronic marketplace requires special packaging; and wherein selecting the at least one add-on item is further based at least in part on an ability to use the special packaging for the at least one add-on item.

* * * * *